Nov. 5, 1957  F. W. SEYBOLD  2,811,872
AUTOMATIC TRANSMISSION
Filed Feb. 28, 1956  2 Sheets-Sheet 1

INVENTOR.
Frederick W. Seybold

Nov. 5, 1957  F. W. SEYBOLD  2,811,872
AUTOMATIC TRANSMISSON
Filed Feb. 28, 1956  2 Sheets-Sheet 2

INVENTOR.
Frederick W. Seybold

United States Patent Office 2,811,872
Patented Nov. 5, 1957

2,811,872

AUTOMATIC TRANSMISSION

Frederick W. Seybold, Scotch Plains, N. J.

Application February 28, 1956, Serial No. 568,233

20 Claims. (Cl. 74—677)

This invention relates to automatic power transmissions and particularly to those adapted for use with internal combustion engines or turbine engines of passenger cars, busses, trucks and military tanks or other applications which require a variable torque and speed device.

A primary object of the present invention is to provide an automatic variable speed transmission whose components are so arranged to make it capable to pass smoothly from the low gear ratio and multiplied torque into the intermediate and then into the direct drive ratio by the application and subsequent release of braking members.

A further feature of this invention is the elimination of the precise timing in the application and release of the different control elements which alter the transmission ratios of the transmission.

Still another object of this invention is to so arrange the components of the transmission that the vehicle in which this transmission is installed is prevented from rolling backward when the transmission is conditioned for forward low gear ratio operation, and likewise is prevented from rolling forward when the transmission is conditioned for reverse operation. This is accomplished without additional components and is brought about by the unique combination of two interconnected planetary gear sets, overrunning clutches and a multiple turbine torque converter, and in this respect this invention is believed to be the first having this feature.

Another object of this invention is the provision for a reverse drive ratio, as well as an overdrive ratio, utilizing the same two interconnected planetary gear sets which provide forward low, intermediate and direct drive ratios.

This transmission includes other features, such as permitting the vehicle to be rocked in snow or mud; downhill braking and manual over-rule or kick-down from direct to intermediate or the low gear ratio.

The above objects and advantages can best be understood when reference is made to the following description taken in connection with the accompanying drawings, in which.

GENERAL ARRANGEMENT

In general, this transmission comprises the combination of a multiple turbine torque converter and two interconnected planetary gear sets, arranged and controlled by friction brakes and clutches, whereby a high starting torque is provided for the rapid acceleration of a motor vehicle from standstill in either direction.

First and second planetary gear sets each comprise two sun gears of different size and a carrier whose compound planetary pinions mesh with their respective sun gears, a sun gear of the first gear set is positively connected to a sun gear of the second gear set.

The hydraulic torque converter comprises a pump member driven by the engine. The fluid actuated by the pump is discharged into a first turbine member, the latter being connected to the carrier of the second planetary gear set.

The fluid discharged by the first turbine member impinges on the blades of a second turbine member which is connected to a sun gear of the first planetary gear set. The remaining sun gear of the second gear set is connected to the driven shaft.

A first overrunning clutch is provided between the carriers of the two gear sets to drivingly connect the carrier of the first gear set to the carrier of the second gear set, when certain driving conditions prevail.

A second overrunning clutch is interposed between the first and second turbine elements. Separate brake means are provided to brake either the first or the second turbine element or the combined sun gears, or the planetary pinion carrier.

Furthermore, clutch means are provided to lock-up the first planetary gear set, a sun gear thereof being connected to the second turbine member, so that when the latter is permitted to rotate in the reverse direction of rotation and the first turbine is braked, the driven shaft will then rotate in the reverse direction.

STRUCTURAL ARRANGEMENT

Figure 1:
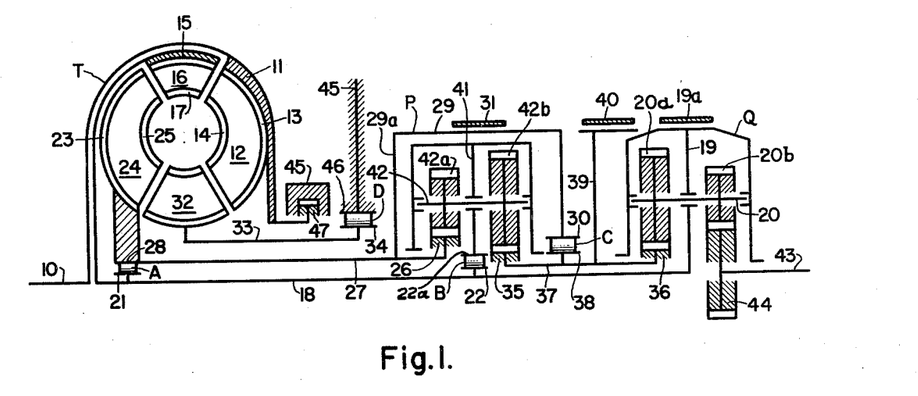
Figure 1 is a vertical, longitudinal section through a power transmission constructed according to my invention.
Figure 2:
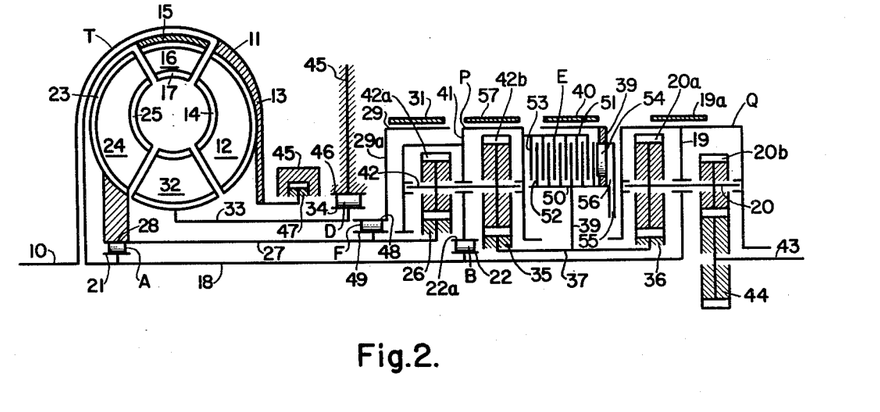
Figure 2 is a vertical, longitudinal section of a power transmission constructed similarly to that shown in Figure 1, but with the additional means required to provide an "overdrive" ratio.

The two transmissions illustrated in Figures 1 and 2 may best be understood by dividing each of them into eight assemblies. The construction of Figure 2 differs from the construction of Figure 1 in respect to only three of these assemblies, and these differences will be described in detail after the eight assemblies of Figure 1 have been completely described.

Structural arrangement of Figure 1

(1) *The driving assembly.*—The driving assembly comprises the drive shaft 10 which is connected to the pump element 11 of the hydro-kinetic torque converter T. Curved blades 12 are equally spaced between the outer shell 13 and the inner shell 14 and forming the pump or impeller of the torque converter T.

(2) *The first turbine assembly.*—The first turbine assembly consists of the toroidal shell 15 having curved blades 16 equally spaced between outer shell 15 and inner shell 17. The shell 15 is connected to one end of the long shaft 18 which is co-axial with the drive shaft 10.

A planetary pinion carrier 19 is connected to the other end of the long shaft 18. Compound planetary pinion sets 20 (usually three of them equally spaced) are rotatably mounted on carrier 19 and these pinions mesh respectively with sun gears which will be described later.

The inner member 21 of an overrunning clutch A is also connected to shaft 18 near its junction with turbine element 15. The inner member 22 of an overrunning clutch B is connected about midway on the shaft 18.

A brake 19a may be applied to carrier 19 to stop the rotation of the first turbine 15.

(3) *The second turbine assembly.*—The second turbine assembly comprises the turbine 23 composed of the curved blades 24 equally spaced between the outer shell 23 and the inner shell 25. A sun gear 26 of the first planetary gear set P is connected by means of a long tubular shaft 27 to the second turbine 23.

The outer member 28 of the overrunning clutch A is mounted on the shaft 27, and thereby turbine 23 can transmit driving torque in the forward direction to the shaft 18. Conversely, shaft 18 may rotate faster than turbine 23 in the forward direction.

A housing or brake drum 29, completely encasing gear set P, is also connected to shaft 27, and the outer member 30 of an overrunning clutch C is mounted thereon. A brake band 31 may be applied to the drum 29, thereby preventing the rotation of the second turbine 23 and the sun gear 26.

(4) *The stator assembly.*—The stator assembly comprises the vaned element 32 which is connected to the tubular shaft 33 to which the inner member 34 of the overrunning clutch D is attached.

(5) *The reaction assembly.*—The reaction assembly comprises the sun gear 35 of the gear set P and the sun gear 36 of the gear set Q and they are connected by means of the tubular shaft 37. The inner member 38 of the overrunning clutch C is also connected to shaft 37, whereby the second turbine 23 may rotate sun gears 35—36 in the reverse direction, or conversely, they may overrun the second turbine in the reverse direction of rotation.

A brake drum 39 is also connected to shaft 37 and a brake band 40 may be applied to the drum 39, whereby sun gears 35—36 are prevented from rotating.

(6) *The direct drive assembly.*—The direct drive assembly consists of the planetary pinion carrier 41 on which the compound planetary pinion sets 42 (usually three of them equally spaced) are rotatably mounted and mesh respectively with the sun gears 26 and 35.

The outer member 22a of the overrunning clutch B is connected to carrier 41, whereby the carrier 41 may transmit forward driving torque to the long shaft 18.

(7) *The driven assembly.*—The driven assembly comprises the driven shaft 43 which is connected to sun gear 44 of the planetary gear set Q.

(8) *The casing and gear pump assembly.*—The casing for the transmission is indicated by reference numeral 45. In the casing is mounted the outer member 46 of the overrunning clutch D which prevents the reverse rotation of the stator element 32, while permitting its forward rotation when the fluid flow in the converter is urging the stator to rotate in this direction.

The oil pump housing is also an integral part of the casing and in this housing rotates the pump gear 47 which is connected to the impeller 11 of the converter T.

*Structural arrangement of Figure 2*

The transmission according to the design shown in Figure 2 differs from that of Figure 1, just described, in certain details pertaining to the second turbine assembly, the reaction assembly and the direct drive assembly. These differences or deviations will now be described in detail.

(3a) *The second turbine assembly.*—A brake drum 29a does not completely encase the gear set P and the overrunning clutch C is absent in this design. Its function will be performed by the multiple plate clutch E which, however, has no direct connection with the second turbine assembly. An overrunning clutch F is interposed between the brake drum 29a and the tubular shaft 27. The inner member 49 of the clutch F is mounted on shaft 27 and its outer member 48 is secured to the brake drum 29a. Clutch F prevents reverse rotation of second turbine 23 as long as brake band 31 is applied to brake drum 29a.

(5a) *The reaction assembly.*—The externally splined member 50 of the multiple plate clutch E is connected to the vertical face of the brake drum 39 in which a ring piston 54 has been incorporated in the chamber 56 into which pressure oil may be conducted through the duct 55.

(6a) *The direct drive assembly.*—An internally splined member 51 is connected to the carrier 41 and externally splined friction clutch plates 53 are slidably mounted on member 51. Internally splined friction clutch plates 52 engage member 50 and they are alternately assembled with plates 53 to form the multiple plate clutch E, whereby, when the latter is energized the reaction assembly will be locked to the direct drive assembly. A brake band 57 is provided and when applied to carrier 41 it will prevent its rotation.

The control mechanism for the brake bands 19a, 31, 40, and 57 is similar to that illustrated in my Patent 2,716,906 and such control mechanisms are now well known in the art. The control mechanism usually comprises a governor operated valve connected into a fluid circuit with a piston valve which may be shifted into various positions by a control lever, usually located on the steering column of the vehicle. This lever may be shifted into various positions such as "neutral," "low," "intermediate," "drive," "overdrive" and "reverse."

OPERATION

A. *Idling or "neutral" operation*

When the vehicle brakes are applied and the engine is idling and all the brake bands of the transmission are released the driven shaft 43 remains stationary. For the purpose of illustrating the design of a transmission embodying this invention the following gear proportions have been selected:

FIRST GEAR SET "P"

| | Teeth |
|---|---|
| First sun gear 26 | 33 |
| Planetary pinion 42a | 23 |
| Second sun gear 35 | 21 |
| Planetary pinion 42b | 37 |

SECOND GEAR SET "Q"

| | |
|---|---|
| Third sun gear 36 | 21 |
| Planetary pinion 20a | 37 |
| Fourth sun gear 44 | 39 |
| Planetary pinion 20b | 17 |

For one revolution of the drive shaft 10 or the first turbine 15, the various assemblies make:

| | Revolutions |
|---|---|
| 1. The driving assembly | +1 |
| 2. The first turbine assembly | +1 |
| 3. The second turbine assembly | −.6 |
| 4. The stator assembly | 0 |
| 5. The reaction assembly | −3.042 |
| 6. The direct drive assembly | +1 |
| 7. The driven assembly | 0 |

B. *Forward drive*

With the foot brake applied the transmission control lever is shifted from "neutral" into the "drive" position and as a result the brake band 31 is applied to the brake drum 29 and thereby the sun gear 26 and the second turbine 23 is prevented from reverse rotation. Upon release of the foot brake and an acceleration of the engine the pump or impeller 11 will discharge fluid against the vanes 16 of the now stalled first turbine.

The curvature of the vanes 12, 16, 24 and 32 of the converter T is shown in my copending application, Serial No. 416,091, now Patent No. 2,763,163, in Figures 2 and 3. The curvature of blades 16 is such that the fluid discharged by the first turbine 15 imparts a reverse torque on the second turbine which is held stationary by the brake band 31 and thereby augments the torque of the first turbine derived from the impeller. At stall the first turbine torque is approximately twice the engine torque. The sun gear 26 now serves as the reaction member of the combined planetary gearing and one forward revolution of the first turbine 15 causes the reaction assembly to rotate backwardly at the rate of −1.52 revolutions and the driven assembly to rotate forwardly +⅜ of a revolution. Therefore, for 100 units of engine torque the driven shaft 43 receives 2×⅝×100 or 533 units of torque at the beginning of motion of the vehicle.

As the speed of the first turbine rises in relation to that of the impeller the fluid discharged from the first turbine into the second turbine produces less and less reverse torque on the latter and finally induces a forward torque thereon. At about this time the governor will cause the application of the brake band 40 to stall the reaction assembly.

If the brake 31 remains "on" the direct drive assembly will also become stalled, this being accommodated by the overrunning clutch B. The carrier 19 now alone is active in the transmission of torque and the sun gear 36 of the gear set Q serves as the reaction member. For one revolution of the first turbine the driven shaft will make .7526 revolution or conversely, it will receive 133 units of torque for each 100 units of torque applied to carrier 19.

This phase of the operation corresponds to the "intermediate" drive ratio, where the converter as well as the planetary gearing multiply the engine torque.

The brake 31 may now be released, whereupon the second turbine will begin to rotate forwardly and as soon as it rotates approximately 6/10 as fast as the first turbine it will be capable to transmit torque from carrier 41 through the overrunning clutch B to the shaft 38 and hence to carrier 19. Sun gear 35 of the reaction assembly serves as the reaction member to further augment the torque delivered to the driven shaft 43.

It is to be observed that there is no precise timing required in the release of brake band 31 after brake band 40 has been applied.

As the speed of both turbines increases relative to the impeller 11 the second turbine becomes capable of absorbing a greater portion of the fluid energy and hence transmits most of the driving torque. Eventually the first turbine on account of its location in the fluid circuit will rotate faster than the fluid can drive it due to the interconnected gearing ratio, and as soon as the speed of the second turbine exceeds .6 that of the first turbine the brake band 40 may also be released. For the time being a small portion of the driving torque is transmitted by the first turbine, while the larger portion of the driving torque is transmitted by the second turbine.

The division of torque in the gear set P in accordance with the gear proportions is as follows:

From 100 units of torque applied on sun gear 26, carrier 41 will receive 60.5 units and sun gear 35 will receive 39.5 units.

The division of torque in the gear set Q in accordance with the gear proportions is as follows:

When the driven shaft receives 100 units of torque, 75.3 units are received from carrier 19 and 24.7 units are received from sun gear 36 of the reaction assembly.

The torque absorbing capacity of the first turbine continues to decline and eventually the second turbine will carry the entire load and as its speed approaches that of the impeller, the stator will also rotate forwardly and the converter T will then operate as an efficient fluid coupling.

The relative rotation between the planetary pinions and sun gears is reduced to a minimum and in direct drive the torque distribution to the components of the transmission is as follows:

|  | Units |
|---|---|
| Impeller 11 | 100 |
| First turbine 15 | 0 |
| Stator 32 | 0 |
| Second turbine 23 | 100 |
| of which |  |
| a. Sun gear 26 receives | 62.5 |
| b. Clutch A receives | 37.5 |
| Sun gear 26 | 62.5 |
| of which |  |
| c. Carrier 41 to clutch B receives | 37.8 |
| d. Sun gear 35—36 receives | 24.7 |
| Carrier 19 receives from shaft 18 | 75.3 |
| of which |  |
| e. From clutch A are | 37.5 |
| f. From clutch B are | 37.8 |
| Driven shaft 43 receives | 100 |
| of which |  |
| g. From carrier 19 are | 75.3 |
| h. From sun gear 36 are | 24.7 |

In the design of Figure 2 the clutch E may now be energized, whereby all relative gear rotation will cease and this will further increase the efficiency of the transmission.

C. Overdrive operation

To take advantage of the fuel economy which can be had through the use of an "overdrive" ratio as shown in the construction of Figure 2, the control lever is shifted into the "overdrive" position. The multiple plate clutch E is released and the brake band 57 is applied, whereby the carrier 41 is stalled.

For each revolution of the second turbine 23 the reaction assembly will make 33/23×37/21=2.528 revolutions. Carrier 19 will also make one revolution, being driven by the second turbine 23 through the overrunning clutch A on shaft 18.

The driven shaft 43 will, therefore, turn faster than one revolution by an amount equal to 1.528 times the gear ratio of gear set Q, or 1.528×21/37×17/39=.3775, or in other words, for each revolution of the engine crankshaft the driven shaft 43 will make 1.3775 revolutions, so that, when the vehicle travels at 60 miles per hour the engine speed is only as fast as it would be when traveling 43.5 miles per hour in direct drive ratio.

In the "overdrive" gear ratio the torque distribution to the components of the transmission is as follows:

|  | Units |
|---|---|
| Second turbine 23 | 100 |
| of which |  |
| a. Clutch A and carrier 19 receive | 54.6 |
| b. Sun gear 26 receives | 45.4 |
| Sun gear 26 | 45.4 |
| of which |  |
| c. Sun gears 35—36 receive | 18.0 |
| d. Carrier 41 and brake 57 receive | 27.4 |
| Driven shaft 43 receives | 72.6 |
| of which |  |
| e. From carrier 19 are | 54.6 |
| f. From sun gear 36 are | 18.0 |

It is again to be noted that no extra gear set is required to provide this transmission with an "overdrive" ratio.

D. Reverse operation

For reverse operation of the transmission the brake band 19a is applied to the carrier 19 of the planetary gear set Q, and all other brake bands are in their released condition. The application of brake band 19a will stall the first turbine 15, it being connected to the carrier 19 by the long shaft 18. The fluid emerging from the first turbine impinges on the vanes 24 of the second turbine 23, causing it to turn in the reverse direction. In the construction of Figure 1 a drive is established from turbine 23 and its connected brake drum 29 to "overrunning" clutch C which will drive the reaction assembly sun gears 35—36, these in turn will rotate the driven shaft 43 in the reverse direction at reduced speed but increased torque.

In the construction of Figure 2 the multiple plate clutch E is also energized to "lock-up" the first planetary gear set P, so that it will rotate reversely when driven by the second turbine and sun gear 26.

In reverse drive the distribution of torque to the components of the transmission shown in Figure 2 is as follows:

| | Units |
|---|---|
| Second turbine 23 receives | —100 |
| of which | |
| a. Carrier 41 receives | —60.5 |
| b. Reaction sun gears 35—36 receive | —39.5 |
| Clutch E transmits from carrier 41 to | |
| c. Reaction sun gears 35—36 | —60.5 |
| d. Total torque, sun gear 36 | —100 |
| e. Brake torque on band 19a | +505 |
| f. Driven shaft torque | —405 |

For each revolution of the sun gear 36 the driven shaft will make $-(21/37 \times 17/39) = -.2476$ revolution, and for each —100 units of torque applied by sun gear 36 the driven shaft will receive $-100 \times 37/21 \times 39/17 = -405$ units of torque.

E. Hill holder or no-roll-back

As long as the brake band 31 remains applied to brake drum 29 the driven shaft 43 cannot rotate in the reverse direction. In other words, should the vehicle come to a halt on an incline or a steep hill it will not be necessary for the driver to apply the foot brakes or manipulate the accelerator in order to prevent backward movement.

This hill holding feature is a great convenience to the driver and in addition is a good safety feature. Dexterous manipulation of the foot or emergency brakes and the accelerator is thereby eliminated in order to again put the vehicle into motion.

No additional component need be incorporated in the transmission in order to provide this hill-holding feature, the components which provide the various forward and reverse speed ratios solely contribute thereto.

Figure 3:
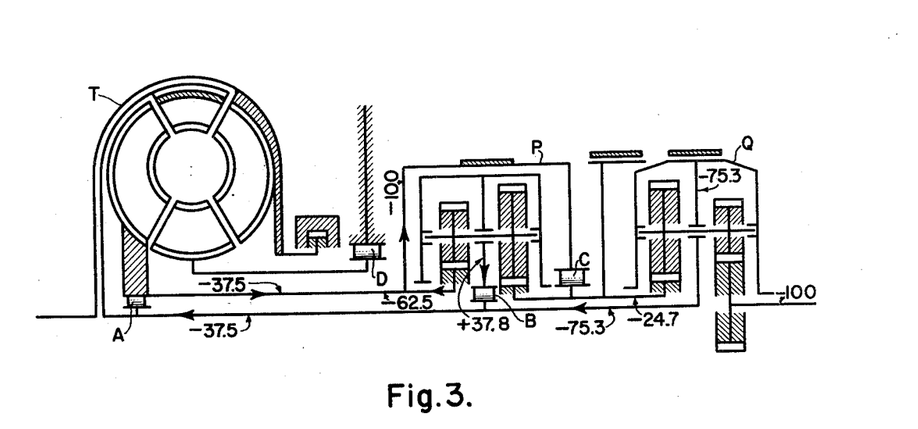
Figure 3 shows the torque distribution produced by 100 units of roll-back torque imposed on the driven shaft of the vehicle to the component elements comprising the transmission shown in Figure 1.
Figure 4:
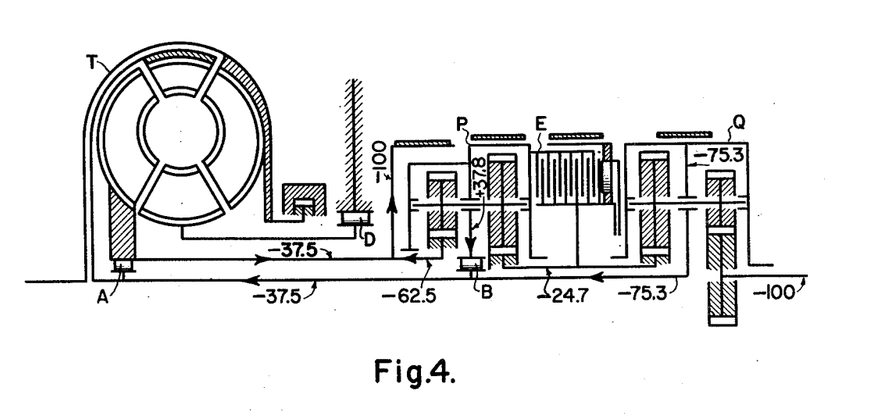
Figure 4 shows the torque distribution produced by 100 units of roll-back torque imposed on the driven shaft of the vehicle to the component elements of the transmission shown in Figure 2.

In order to completely demonstrate its unique features reference to Figures 3 and 4 will show the torque distribution imposed by the vehicle on the transmissions constructed according to Figures 1 and 2 respectively.

An assumed roll-back-torque of —100 units imposed on shaft 43 will produce a reverse torque of —75.3 units on carrier 19 and a reverse torque of —24.7 units on the reaction sun gears 35—36. Sun gear 35 which meshes with planetary pinion 42b of gear set P induces a forward torque of +37.8 units on carrier 41 and a reverse torque of —62.5 units on sun gear 26.

This forward torque of 37.8 units on carrier 41 is transmitted through the overrunning clutch B to shaft 18, thereby reducing its reverse torque from —75.3 units to —37.5 units, the latter amount is applied through the overrunning clutch A to shaft 27 to which are added the —62.5 units from its connected sun gear 26. Shaft 27 being connected to brake drum 29, therefore, receives —100 units of reverse torque which will be absorbed by the brake band 31. In other words, a roll-back-torque on the driven shaft cannot produce any relative motion in the two planetary gear sets and also none on the two interconnected turbines.

When the transmission is conditioned for reverse operation the brake 19a is applied, whereby the carrier 19 is held. A forward torque imposed on the driven shaft 43 would, therefore, produce a forward torque on the reaction sun gears 35 and 36, which would be transmitted through the overrunning clutch C of Figure 1, or through the engaged clutch E of Figure 2 to the second turbine 23 and therefrom through the overrunning clutch A to the shaft 18 and hence to carrier 19, which is braked for reverse operation. Therefore, forward motion of the vehicle is impossible when brake band 19a is applied to carrier 19.

F. Alternate forward drive—Figure 2

An alternate sequence in the application of the control elements to bring about the transition from the low gear ratio to the direct drive ratio in the transmission will now be described.

The initial phase of forward drive is the same as described for Figure 1, but instead of applying brake band 40 to brake drum 39 the multiple plate clutch E is energized, whereby the reverse rotation of the reaction assembly ceases because the first planetary gear set P becomes "locked-up" and the latter being connected to the second turbine 23 which may still be subjected to reverse torque. Brake band 31 prevents such reverse rotation of turbine 23, while overrunning clutch F permits its forward rotation. The first turbine 15 driving carrier 19 of the gear set Q and sun gear 36 serving as the reaction member will produce 133 units of torque on the driven shaft 43 for each 100 units of torque applied to carrier 19, and the driven shaft will rotate .7526 revolution for one revolution of the turbine 15.

As soon as turbine 23 feels a forward torque of sufficient magnitude to turn sun gear 36 the overrunning clutch F will accommodate forward rotation without the release of brake band 31 from the brake drum 19a. As turbine 23 increases its speed it becomes capable to take on a greater portion of the load, while the first turbine 15 continues to carry less and less load, and finally in direct drive ratio the second turbine 23 will continue to drive carrier 19 through the overrunning clutch A as previously described. This condition also produces a "lock-up" of the second gear set Q so that no relative gear rotation in both gear sets takes place, thereby reducing wear and tear in the transmission.

G. Hill braking

In order to efficiently brake the vehicle by means of the engine when descending a steep hill or mountain and using the transmission shown in Figure 1 brake band 40 is applied to brake drum 39, stalling the reaction assembly 35—36. The driven shaft 43 will drive the first turbine 15 through the gear set Q and the turbine will tend to accelerate the pump 11 which is connected to the crank shaft of the engine.

If more severe braking is desired the control lever may be shifted into the "low" position, whereby brake band 31 is applied to brake drum 29 stalling the second turbine 23 and the sun gear 26.

When using the transmission shown in Figure 2 the same result can be attained by engaging clutch E and applying brake band 57 to brake drum of carrier 41, whereby the second turbine 23, gear set P and sun gear 36 are stalled.

H. Down-shifting

The transmission can be "down-shifted" from "overdrive" or "direct" drive into "intermediate" for passing another vehicle or for "hill-braking." The vehicle may be "rocked" in snow or mud by the mere shifting of the control lever from the "low" position into the "reverse" position.

Both constructions as illustrated in Figures 1 and 2 have now been described in detail and their operation has been fully explained and therefrom obvious modifications, rearrangements and minor improvements will suggest themselves to those skilled in the art.

It should further be understood that the gear proportions used in describing the invention are subject to considerable variation to accommodate various operating conditions and the term "overrunning" clutch should be understood to include the various one-way clutch devices as for example the roller clutch, the sprag clutch or the spring clutch and others. It is also obvious that band brakes may be replaced by single or multiple plate disc brakes and such modifications and rearrangements shall come within the scope of the following claims.

CONTROL SCHEDULE FOR FIGURE 1

| Drive Ratio | Brake 31 | Brake 40 | Brake 19a | Clutch C |
|---|---|---|---|---|
| Low | x |  |  |  |
| Int |  | x |  |  |
| Direct |  |  |  |  |
| Rev |  |  | x | x |

CONTROL SCHEDULE FOR FIGURE 2

| Drive Ratio | Brake 31 | Clutch E | Brake 57 | Brake 40 | Brake 19a |
|---|---|---|---|---|---|
| Low | x |  |  |  |  |
| Int | x | x |  |  |  |
| Direct | x | x |  |  |  |
| O. D. | x |  | x |  |  |
| Hill Br | x | x | x |  |  |
| Rev |  | x |  |  | x |
| Pass | x |  |  | x |  |

| Claim No. | Figure 1 | Figure 2 |
|---|---|---|
| 1 | x |  |
| 2 | x |  |
| 3 | x |  |
| 4 | x |  |
| 5 | x |  |
| 6 | x |  |
| 7 | x | x |
| 8 | x |  |
| 9 | x |  |
| 10 |  | x |
| 11 |  | x |
| 12 |  | x |
| 13 | x |  |
| 14 |  | x |
| 15 | x | x |
| 16 |  | x |
| 17 |  | x |
| 18 |  | x |
| 19 |  | x |
| 20 |  | x |

I claim:

1. A variable speed and torque transmission comprising in combination, coaxial drive and driven shafts, a multiple element hydraulic torque converter having a pump, first and second turbines and a stator interposed between said pump and said second turbine, said pump being connected to said drive shaft, first and second planetary gear sets, each having two sun gears of different size and a carrier with rotatably mounted compound planetary pinions thereon and respectively meshing with said sun gears, a first connecting member between said first turbine and the carrier of said second planetary gear set, said second turbine being connected to the first sun gear of said first planetary gear set, means to drivingly connect the carrier of said first planetary gear set to said first connecting member to transmit torque forwardly thereto, a second connecting member between the second sun gear of the first planetary gear set and the first sun gear of the second planetary gear set, the second sun gear thereof being connected to said driven shaft, means to drivingly connect said second turbine to said second connecting member to transmit torque reversely thereto, and means to brake the carrier of said second planetary gear set to drive said driven shaft in the reverse direction at reduced speed but increased torque.

2. A variable speed and torque transmission comprising in combination, coaxial drive and driven shafts, a multiple element hydraulic torque converter having a pump, first and second turbines and a stator with one-way brake means thereon and interposed between said pump and second turbine, said pump being connected to said drive shaft, first and second planetary gear sets, each having two sun gears of different size and a carrier with rotatably mounted compound planetary pinions thereon and respectively meshing with said sun gears, a first connecting member between said first turbine and the carrier of said second planetary gear set, said second turbine being connected to the first sun gear of said first planetary gear set, means to drivingly connect the carrier of said first planetary gear set to said first connecting member to transmit torque forwardly thereto, a second connecting member between the second sun gear of the first planetary gear set and the first sun gear of the second planetary gear set, the second sun gear thereof being connected to said driven shaft, means to drivingly connect said second turbine to said second connecting member to transmit torque reversely thereto, and means to brake the carrier of said second planetary gear set to drive said driven shaft in the reverse direction at reduced speed but increased torque.

3. A variable speed and torque transmission comprising in combination, coaxial drive and driven shafts, a multiple element hydraulic torque converter having a pump, first and second turbines and a stator interposed between said second turbine and pump, said pump being connected to said drive shaft, first and second planetary gear sets, each comprising two sun gears of different size and a carrier with rotatably mounted compound planetary pinions thereon and respectively meshing with said two sun gears, a first connecting member between said first turbine and the carrier of said second planetary gear set, said second turbine being connected to the first sun gear of said first planetary gear set, an overrunning clutch drive connection between the carrier of said first planetary gear set and said first connecting member to transmit torque forwardly thereto, a second connecting member between the second sun gear of said first planetary gear set and the first sun gear of said second planetary gear set, the second sun gear thereof being connected to said driven shaft, an overrunning clutch drive connection between said second turbine and said second connecting member to transmit torque reversely thereto, and means to brake the carrier of said second planetary gear set to drive said driven shaft in the reverse direction at reduced speed but increased torque.

4. A variable speed and torque transmission comprising in combination, coaxial drive and driven shafts, a multiple element hydraulic torque converter having a pump, first and second turbines and a stator with one-way brake means thereon and interposed between said second turbine and pump, said pump being connected to said drive shaft, first and second planetary gear sets, each comprising two sun gears of different size and a carrier with rotatably mounted compound planetary pinions thereon and respectively meshing with said two sun gears, a first connecting member between said first turbine and the carrier of said second planetary gear set, said second turbine being connected to the first sun gear of said first planetary gear set, an overrunning clutch drive connection between the carrier of said first planetary gear set and said first connecting member to transmit torque forwardly thereto, a second connecting member between the second sun gear of the first planetary gear set and the first sun gear of said second planetary gear set, the second sun gear thereof being connected to said driven shaft, an overrunning clutch drive connection between said second turbine and said second connecting member to transmit torque reversely thereto, and means to brake the carrier of said second planetary gear set to drive said driven shaft in the reverse direction at reduced speed but increased torque.

5. A variable speed and torque transmission comprising in combination, coaxial drive and driven shafts, a multiple element hydraulic torque converter having a pump, first and second turbines and a stator interposed between said pump and said second turbine, said pump being connected to said drive shaft, first and second planetary gear sets, each having two sun gears of different size and a carrier with rotatably mounted compound planetary pinions thereon and respectively meshing with said sun gears, a first connecting member between said first turbine and the carrier of said second planetary gear set, said second turbine being connected to the first sun gear of said first planetary gear set, means to drivingly connect the carrier of said first planetary gear set to said first connecting member to transmit torque forwardly thereto, means to drivingly connect said second turbine to said first connecting member to transmit torque forwardly thereto, a first brake means on said second turbine, a second connecting member between the second sun gear of the first planetary gear set and the first sun gear of the second planetary gear set, the second sun gear thereof being connected to said driven shaft, a second brake means on said second connecting member, means to drivingly connect said second turbine to said second connecting member to transmit torque reversely thereto, and a third brake means on the carrier of said second planetary gear set, so that when said first brake means is energized the driven shaft will receive a high torque at reduced speed, and when said second brake means is energized and said first brake means is released the driven shaft will receive a lesser torque at increased speed, and when said second brake means is released said second turbine alone will drive said first and second connecting members, whereby the driven shaft will operate in the direct drive ratio.

6. A variable speed and torque transmission comprising in combination, coaxial drive and driven shafts, a multiple element hydraulic torque converter having a pump, first and second turbines and a stator with one-way brake means thereon and interposed between said pump and said second turbine, said pump being connected to said drive shaft, first and second planetary gear sets, each comprising two sun gears of different size and a carrier with rotatably mounted compound planetary pinions thereon and respectively meshing with said sun gears, a first connecting member between said first turbine and the carrier of said second planetary gear set, said second turbine being connected to the first sun gear of said first planetary gear set, means to drivingly connect the carrier of said first planetary gear set to said first connecting member to transmit torque forwardly thereto, means to drivingly connect said second turbine to said first connecting member to transmit torque forwardly thereto, a first brake means on said second turbine, a second connecting member between the second sun gear of the first planetary gear set and the first sun gear of the second planetary gear set, the second sun gear thereof being connected to said driven shaft, a second brake means on said second connecting member, means to drivingly connect said second turbine to said second connecting member to transmit torque reversely thereto, and a third brake means on the carrier of said second planetary gear set, so that when said first brake means prevents rotation of said second turbine the driven shaft will receive a high torque at reduced speed, and when said second brake means prevents rotation of said second connecting member and its connected sun gears and said first brake means is released the driven shaft will receive a lesser torque at increased speed, and when said second brake means is released said second turbine alone will drive said first and second connecting members, whereby the driven shaft will operate in the direct drive ratio.

7. A variable speed and torque transmission comprising in combination, coaxial drive and driven shafts, a multiple element hydraulic torque converter comprising a pump, first and second turbines and a stator with one-way brake means thereon and positioned between said second turbine and said pump, said pump being connected to said drive shaft, and first and second planetary gear sets each comprising first and second gear elements and a carrier element with compound planetary pinions in mesh with said first and second gear elements, a first connecting member between said first turbine and the carrier element of the second planetary gear set, said second turbine being connected to the first gear element of the first planetary gear set, the carrier element thereof being drivingly connected to said first connecting member, the first gear element of said second planetary gear set being connected to said driven shaft, a second connecting member between the second gear elements of said planetary gear sets, means to drivingly connect said second turbine to said first connecting member to transmit forward torque thereto, a first brake means on said second turbine, a second brake means on said second connecting member, whereby the transmission will operate in the forward low gear ratio when said first brake means only is energized, and in the forward intermediate gear ratio when said second brake means only is energized, and in the direct drive gear ratio when both brake means are de-energized.

8. A variable speed and torque transmission comprising in combintion, coaxial drive and driven shafts, a multiple element hydraulic torque converter comprising a pump, first and second turbines and a stator with one-way brake means thereon and positioned between said second turbine and said pump, said pump being connected to said drive shaft, and first and secondary planetary gear sets each comprising first and second gear elements and a carrier element with compound planetary pinions in mesh with said first and second gear elements, a first connecting member between said first turbine and the carrier element of the second planetary gear set, said second turbine being connected to the first gear element of the first planetary gear set, the carrier element thereof being drivingly connected to said first connecting member, the first gear element of said second planetary gear set being connected to said driven shaft, a second connecting member between the second gear elements of said planetary gear sets, means to drivingly connect said second turbine to said first connecting member to transmit forward torque thereto, means to drivingly connect said second turbine to said second connecting member, a first brake means on said second turbine, a second brake means on said second connecting member, a third brake means on said first turbine and its connected planetary pinion carrier element, whereby the transmission will operate in the forward low gear ratio when said first brake means only is energized, and in the forward intermediate gear ratio when said second brake means only is energized, and in the direct drive gear ratio when all three brake means are de-energized, and in the reverse gear ratio when said third brake means only is energized.

9. A variable speed and torque transmission comprising in combination, coaxial drive and driven shafts, a multiple element hydraulic torque converter comprising a pump, first and second turbines and a stator with one-way brake means thereon and interposed between said second turbine and said pump, said pump being connected to said drive shaft, and first and second planetary gear sets each comprising first and second gear elements and a carrier element with compound planetary pinions in mesh with said first and second gear elements, a first connecting member between said first turbine and the carrier element of the second planetary gear set, said second turbine being connected to the first gear element of the first planetary gear set, the carrier element thereof having an overrunning clutch means to transmit torque forwardly to said first connecting member, the first gear element of said second planetary gear set being connected to said driven shaft, a second connecting member between the second gear elements of said planetary gear sets, an overrunning clutch interposed between said second turbine and said first connecting member to transmit torque forwardly thereto, an overrunning clutch interposed between said second turbine and said second connecting member, a first brake means on said second turbine, a second brake means on said second connecting member, a third brake means on said first turbine and its connected planetary pinion carrier element, whereby the transmission will operate in the forward low gear ratio when said first brake means only is energized, and in the forward intermediate gear ratio when said second brake means only is energized, and in the direct drive gear ratio when all three brake means are de-energized, and in the reverse gear ratio when said third brake means only is energized.

10. A variable speed and torque transmission comprising in combination, coaxial drive and driven shafts, a multiple element hydraulic torque converter comprising a pump connected to said drive shaft, first and second turbines, and a stator with one-way brake means thereon and positioned between said pump and said second turbine, and first and second planetary gear sets, each having two sun gears of different size and a carrier with a plurality of rotatably mounted compound planetary pinions thereon, said pinions repectively meshing with said sun gears, a first member connecting said first turbine and the carrier of said second planetary gear set, said second turbine being connected to the first sun gear of said first planetary gear set, means to drivingly connect the carrier of said first planetary gear set to said first member to transmit forward torque thereto, a second member connecting the second sun gear of said first planetary gear set to the first sun gear of said second planetary gear set, the second sun gear thereof being connected to said driven shaft, a brake drum on each of the carriers, a brake drum on said second turbine and a brake drum on said second member, individual brake means adapted to contact said brake drums respectively whereby to hold them stationary, means to lock-up said first planetary gear set whereby said gear set will rotate as a unit when driven by said second turbine, and means to drivingly connect said second turbine and said first member to transmit forward torque thereto.

11. A variable speed and torque transmission comprising in combination, coaxial drive and driven shafts, a multiple element hydraulic torque converter comprising a pump connected to said drive shaft, first and second turbines, and a stator with one-way brake means thereon and positioned between said pump and said second turbine, and first and second planetary gear sets, each having two sun gears of different size and a carrier with a plurality of rotatably mounted compound planetary pinions thereon, said pinions respectively meshing with said sun gears, a first member connecting said first turbine and the carrier of said second planetary gear set, said second turbine being connected to the first sun gear of said first planetary gear set, an overrunning clutch to drivingly connect the carrier of said first planetary gear set to said first member to transmit forward torque thereto, a second member connecting the second sun gear of said first planetary gear set to the first sun gear of said second planetary gear set, the second sun gear thereof being connected to said driven shaft, a brake drum on each of the carriers, a brake drum on said second turbine and a brake drum on said second member, individual brake means adapted to contact said brake drums respectively whereby to hold them stationary, an overrunning clutch to drivingly connect said second turbine and said first member to transmit forward torque thereto, and clutch coupling means on said first carrier cooperating with clutch coupling means on said second member, and selective fluid actuating means for said clutch coupling means, whereby when said clutch coupling means is energized relative gear rotation in said first planetary gear set ceases.

12. A variable speed and torque transmission comprising in combination, coaxial drive and driven shafts, a multiple element hydraulic torque converter comprising a pump connected to said drive shaft, first and second turbines, and a stator with one-way brake means thereon and positioned between said pump and said second turbine, first and second planetary gear sets, each having two sun gears of different size and a carrier with a plurality of rotatably mounted compound planetary pinions thereon, said pinions respectively meshing with said sun gears, a first member connecting said first turbine and the carrier of said second planetary gear set, said second turbine being connected to the first sun gear of said first planetary gear set, an overrunning clutch to drivingly connect the carrier of said first planetary gear set to said first member to transmit forward torque thereto, a second member connecting the second sun gear of said first planetary gear set to the first sun gear of said second planetary gear set, the second sun gear thereof being connected to said driven shaft, a brake drum on each of the two carriers, a third brake drum, one-way brake means interposed between said third brake drum and said second turbine, individual brake means adapted to contact said brake drums respectively whereby to hold them stationary, an overrunning clutch to drivingly connect said second turbine and said first member to transmit forward torque thereto, and clutch coupling means on said first carrier cooperating with clutch coupling means on said second member, and selective fluid actuating means for energizing said clutch coupling means, so that when said third brake drum is held in the initial driving phase the first turbine alone is active and the second member with its associated sun gears will rotate reversely and the driven shaft will receive a high torque, and when said clutch coupling means is energized in an intermediate driving phase said second member will cease to rotate reversely and will serve as the reaction member of said second planetary gear set and the driven shaft will receive a lesser torque with an increase in speed, and when the fluid flow in the converter imparts forward torque on said second turbine in a final driving phase the driven shaft will rotate at the same speed as the driving turbines and all relative gear rotation will cease.

13. A variable speed and torque transmission comprising in combination, coaxial drive and driven shafts, a multiple element hydraulic torque converter composed of a pump connected to said drive shaft, first and second turbines, and a stator with one-way brake means thereon and positioned between said pump and said second turbine, first and second planetary gear sets, each having two sun gears of different size and a carrier with a plurality of rotatably mounted compound planetary pinions thereon, said pinions respectively meshing with said sun gears, a first member connecting said first turbine and the carrier of said second planetary gear set, said second turbine being connected to the first sun gear of said first planetary gear set, an overrunning clutch to drivingly connect the carrier of said first planetary gear set to said first member to transmit forward torque thereto, a second member connecting the second sun gear of said first planetary gear set to the first sun gear of said second planetary gear set, the second sun gear thereof being connected to said driven shaft, a brake drum on said second turbine, brake means adapted to contact said brake drum whereby to hold said drum stationary, an overrunning clutch to drivingly connect said first member and said second turbine to transmit a reverse torque thereto, so that when said brake drum is held and a reverse torque is imposed on said driven shaft reverse rotation of said driven shaft is prevented thereby.

14. A variable speed and torque transmission comprising in combination, coaxial drive and driven shafts, a multiple element hydraulic torque converter comprising a pump connected to said drive shaft, first and second turbines, and a stator with one-way brake means thereon and positioned between said pump and said second turbine, first and second planetary gear sets, each having two sun gears of different size and a carrier with a plurality of rotatably mounted compound planetary pinions thereon, said pinions respectively meshing with said sun gears, a first member connecting said first turbine and the carrier of said second planetary gear set, said second turbine being connected to the first sun gear of said first planetary gear set, an overrunning clutch to drivingly connect the carrier of said first planetary gear set to said first member to transmit forward torque thereto, a second member connecting the second sun gear of said first planetary gear set to the first sun gear of said second planetary gear set, the second sun gear thereof being connected to said driven shaft, a brake drum, overrunning clutch means between said brake drum and said second turbine, brake means adapted to contact said brake drum whereby to hold said brake drum stationary, an overrunning clutch to drivingly connect said first member and said second turbine to transmit a reverse torque thereto, so that when said brake drum is held and a reverse torque is imposed on said driven shaft reverse rotation of said driven shaft is prevented thereby.

15. In a variable speed mechanism to deliver uninterrupted torque from a drive shaft to a coaxial driven shaft, comprising in combination a pump, multi-turbine, stator hydraulic torque converter interconnected with first and second planetary gear sets positioned between said converter and said driven shaft, each gear set being composed of two sun gears of different size and a planetary pinion carrier with rotatably mounted compound pinions there on and engaging said sun gears respectively, the pump of said converter being connected to said drive shaft, a first turbine having a first connection with the carrier of said second gear set, a second turbine being connected to one of the sun gears of said first gear set, the stator having one-way brake means thereon for preventing its reverse rotation, the other sun gear of said first gear set having a second connection with one sun gear of said second gear set, the other sun gear thereof being connected to said driven shaft, the carrier of said first gear set having a one-way driving means cooperating with said first connection to transmit forward torque thereto, a one-way driving means connecting said second turbine and said first connection to transmit forward torque thereto, means to brake said second turbine and connected sun gear, whereby, in a first plase, said driven shaft will receive multiplied torque when said second turbine is braked and said first turbine receives fluid energized by said pump, and in an intermediate phase when said brake means is released and the fluid imparts a forward torque to said second turbine said driven shaft will rotate at increased speed and a lesser torque, and in a final phase said second turbine will transmit the pump torque to said driven shaft and all planetary gear movement in both gear sets will terminate, whereby said driven shaft will attain the speed of said second turbine.

16. In a variable speed mechanism to deliver uninterrupted torque from a drive shaft to a coaxial driven shaft, comprising in combination a pump, multi-turbine, stator hydraulic torque converter interconnected with first and second planetary gear sets positioned between said converter and said driven shaft, each gear set being composed of two sun gears of different size and a planetary pinion carrier with rotatably mounted compound pinions thereon and engaging said sun gears respectively, the pump of said converter being connected to said drive shaft, a first turbine having a first connection with the carrier of said second gear set, a second turbine being connected to one of the sun gears of said first gear set, the stator having one-way brake means thereon for preventing its reverse rotation, the other sun gear of said first gear set having a second connection with one sun gear of said second gear set, the other sun gear thereof being connected to said driven shaft, the carrier of said first gear set having a one-way driving means cooperating with said first connection to transmit forward torque thereto, a one-way driving means connecting said second turbine and said first connection to transmit forward torque thereto, one-way brake means on said second turbine to prevent its reverse rotation, whereby, in a first phase, said driven shaft will receive multiplied torque when said first turbine receives fluid energized by said pump, and in an intermediate phase, when the fluid imparts a forward torque to said second turbine said driven shaft will rotate at increased speed and receive a lesser torque, and in a final phase, said second turbine will transmit the pump torque to said driven shaft and all planetary gear movement in both gear sets will terminate, whereby said driven shaft will rotate in unison with said second turbine.

17. In a variable speed mechanism to deliver uninterrupted torque from a drive shaft to a coaxial driven shaft, comprising in combination a pump, multi-turbine, stator hydraulic torque converter interconnected with first and second planetary gear sets positioned between said converter and said driven shaft, each gear set being composed of two sun gears of different size and a planetary pinion carrier with rotatably mounted compound pinions thereon and engaging said sun gears respectively, the pump of said converter being connected to said drive shaft, a first turbine having a first connection with the carrier of said second gear set, a second turbine being connected to one of the sun gears of said first gear set, the stator having one-way brake means thereon to prevent its reverse rotation, the other sun gear of said first gear set having a second connection with one sun gear of said second gear set, the other sun gear thereof being connected to said driven shaft, the carrier of said first gear set having one-way driving means cooperating with said first connection to transmit forward torque thereto, a one-way driving means connecting said second turbine and said first connection to transmit forward torque thereto, one-way brake means on said second turbine to prevent its reverse rotation, and brake means on the carrier of said first gear set, whereby, in a first phase, said driven shaft will receive multiplied torque when said first turbine receives fluid energized by said pump, and in a first intermediate phase, when the fluid imparts a forward torque to said second turbine said driven shaft will rotate at increased speed and receive a lesser torque, and in a second intermediate phase, said second turbine will transmit the pump torque to said driven shaft and all planetary gear movement will terminate, whereby said driven shaft will rotate in unison with said second turbine, and in a final phase, when the carrier of said first gear set is braked the driven shaft will rotate faster than said first and second turbines.

18. In a power transmission, the combination of a drive shaft, a coaxial driven shaft, a hydraulic torque converter comprising a pump, a first turbine, a second turbine and a stator with one-way brake means thereon to prevent its reverse rotation in order to multiply torque, two interconnected planetary gear sets, each comprising a first and second sun gear of different size and a planetary pinion carrier with a plurality of rotatably mounted compound pinions thereon and engaging said sun gears respectively, said pump being connected to said drive shaft, a first member connecting said first turbine to the carrier of said second gear set, a second member connecting said second turbine and said first sun gear of the first gear set, a third member connecting said second sun gear of the first gear set and said first sun gear of the second gear set, said second sun gear thereof being connected to said driven shaft, a first one-way driving means interposed between said first and second members to transmit forward torque to said first member, a second one-way driving means interposed between the carrier of said first gear set and said first member to transmit forward torque thereto, a first brake drum, one-way brake means interposed between said second member and said first brake drum, a second brake drum connected to the carrier of said first gear set, a third brake drum connected to the carrier of said second gear set, clutch coupling means connected to the carrier of said first gear set cooperating with clutch coupling means connected to said third member, and selective fluid actuating means for said clutch coupling means, individual brake means adapted to contact said brake drums respectively whereby to hold them stationary, whereby, when said first brake drum is held the transmission will automatically advance from the low gear ratio into the direct drive ratio; when said clutch coupling means is energized the transmission is provided with a distinct intermediate gear ratio; when, in addition, said second brake drum is held the transmission is capable of hill braking; and when said clutch coupling means is released and said second brake drum is held the transmission will operate in an overdrive ratio; and when said third brake drum is held and all other brake means are released and said clutch coupling means is energized the transmission will operate in a reverse gear ratio.

19. In a power transmission as set forth in claim 18 including in addition thereto a fourth brake drum connected to said third member, whereby another intermediate gear ratio becomes available for passing or hill braking.

20. In a power transmission as set forth in claim 18, whereby, when said first brake drum is held and the fluid energized by said pump is unable to drive the first turbine and a reverse torque is imposed on said driven shaft reverse rotation of said driven shaft is prevented.

References Cited in the file of this patent

UNITED STATES PATENTS

| | | |
|---|---|---|
| 2,312,849 | Pollard | Mar. 2, 1943 |
| 2,768,537 | Seybold | Oct. 30, 1956 |